Oct. 27, 1936.　　　A. G. BROWN　　　2,058,769
HEATING APPARATUS AND METHOD OF HEATING
Filed Dec. 5, 1933　　　5 Sheets-Sheet 1
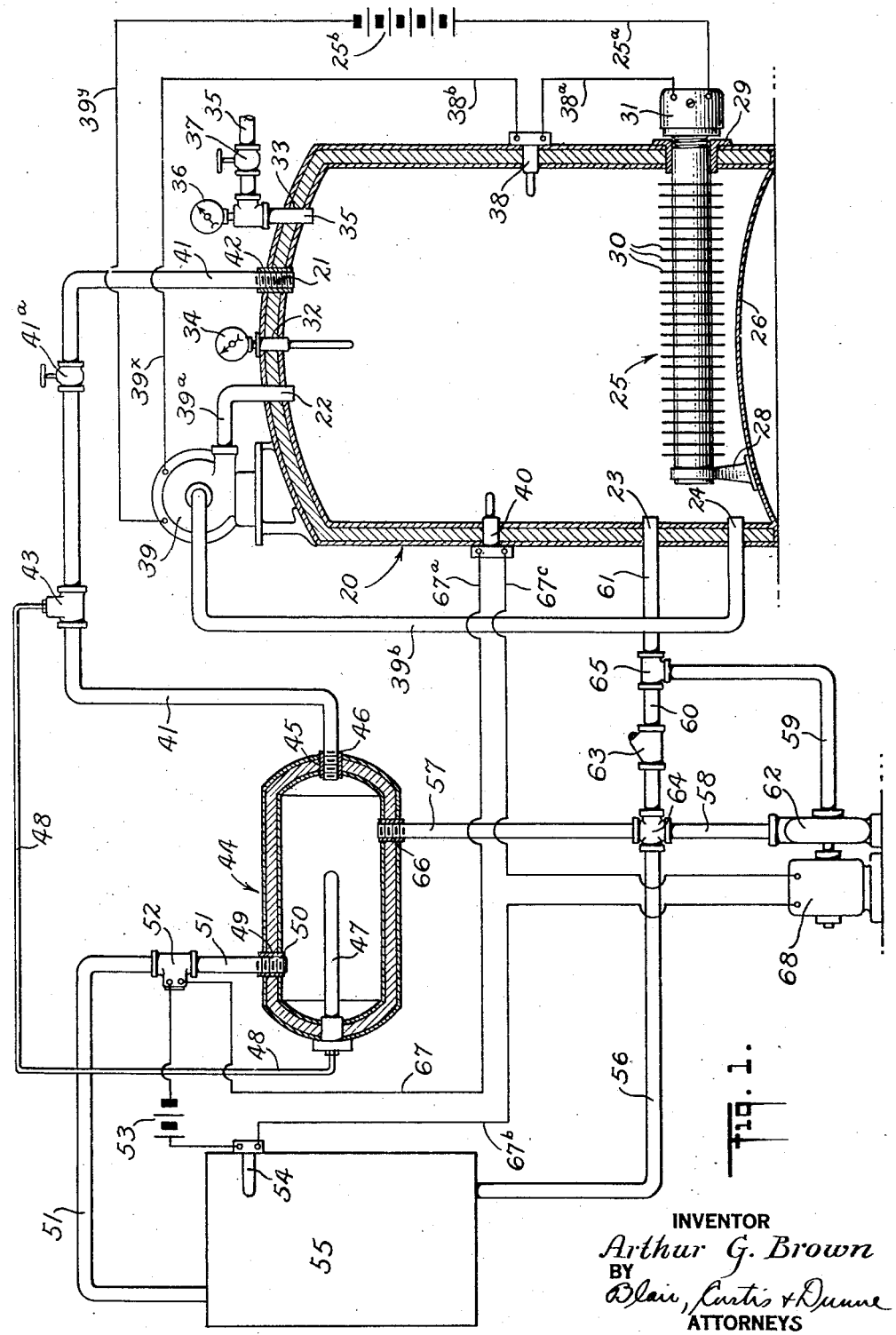
INVENTOR
*Arthur G. Brown*
BY
*Blair, Curtis & Dunne*
ATTORNEYS Oct. 27, 1936.                A. G. BROWN                 2,058,769
              HEATING APPARATUS AND METHOD OF HEATING
                   Filed Dec. 5, 1933        5 Sheets-Sheet 2
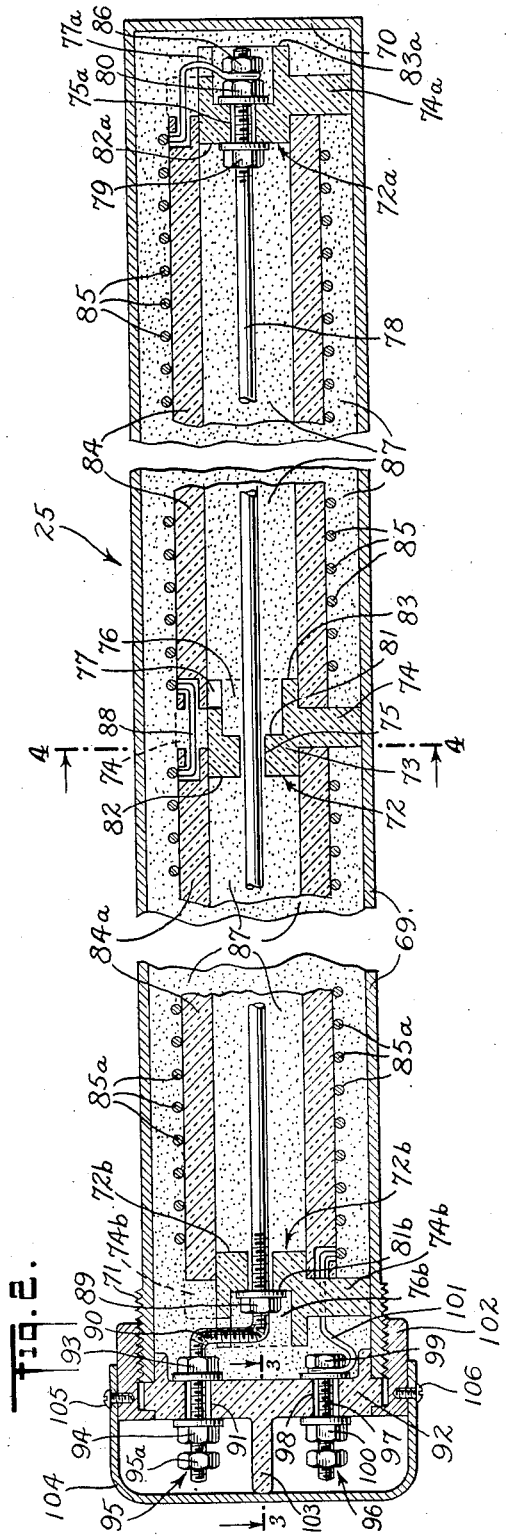
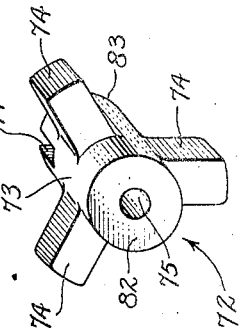
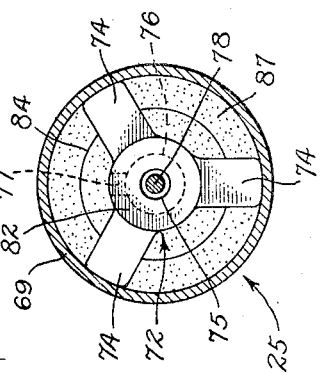
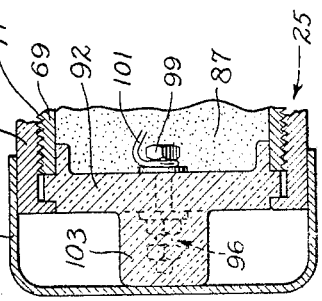
INVENTOR
Arthur G. Brown
BY
Blair, Curtis & Dunne
ATTORNEYS Oct. 27, 1936.  A. G. BROWN  2,058,769
HEATING APPARATUS AND METHOD OF HEATING
Filed Dec. 5, 1933  5 Sheets-Sheet 3
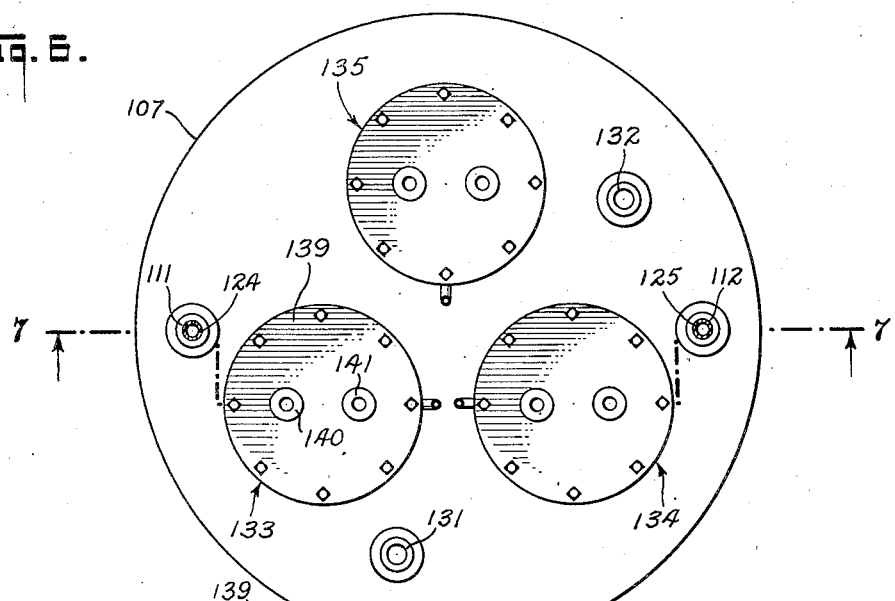
Fig. 6.
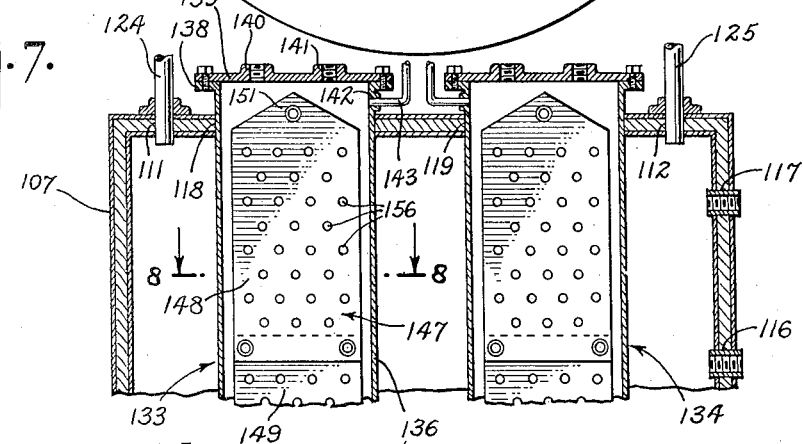
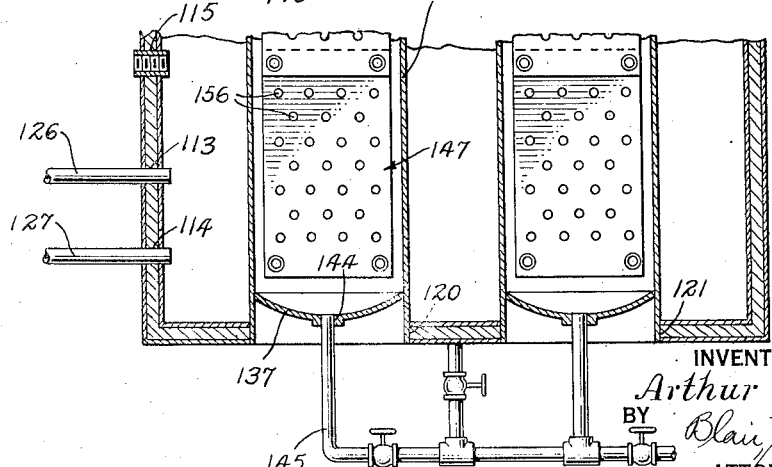
Fig. 7.
INVENTOR
Arthur G. Brown
BY
ATTORNEYS

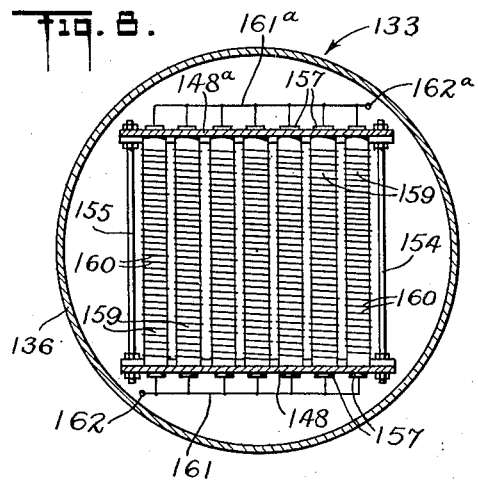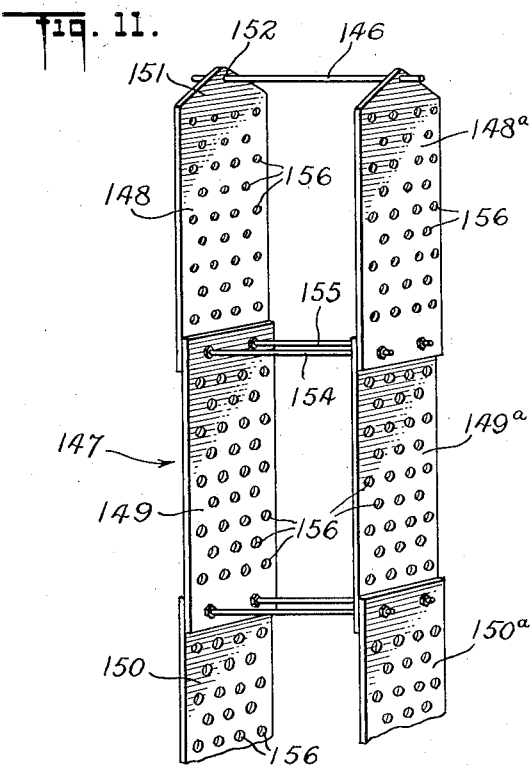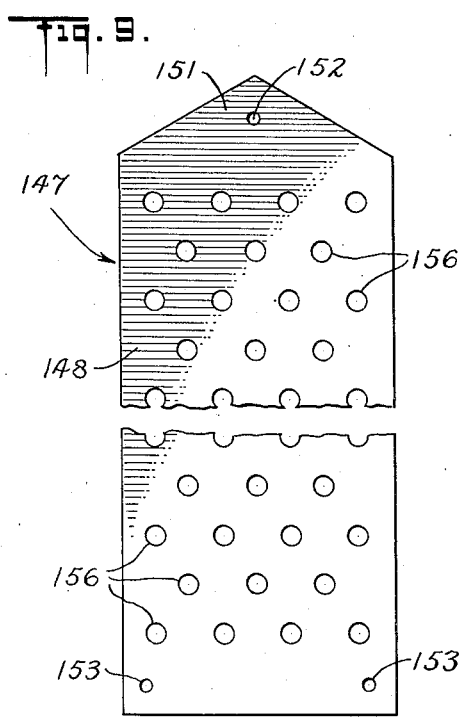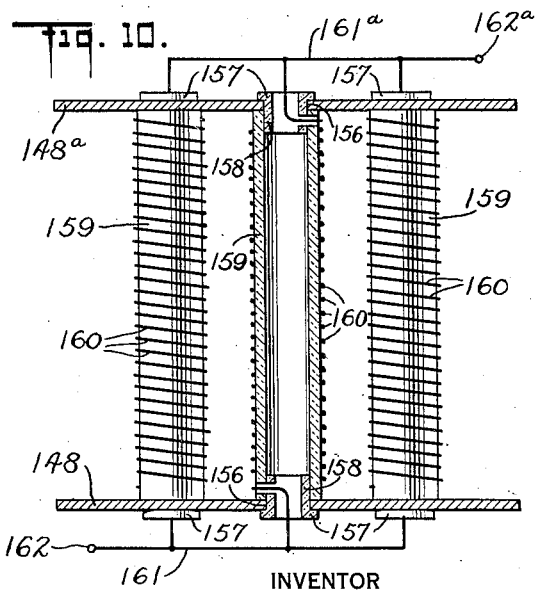

Oct. 27, 1936.  A. G. BROWN  2,058,769
HEATING APPARATUS AND METHOD OF HEATING
Filed Dec. 5, 1933   5 Sheets—Sheet 5
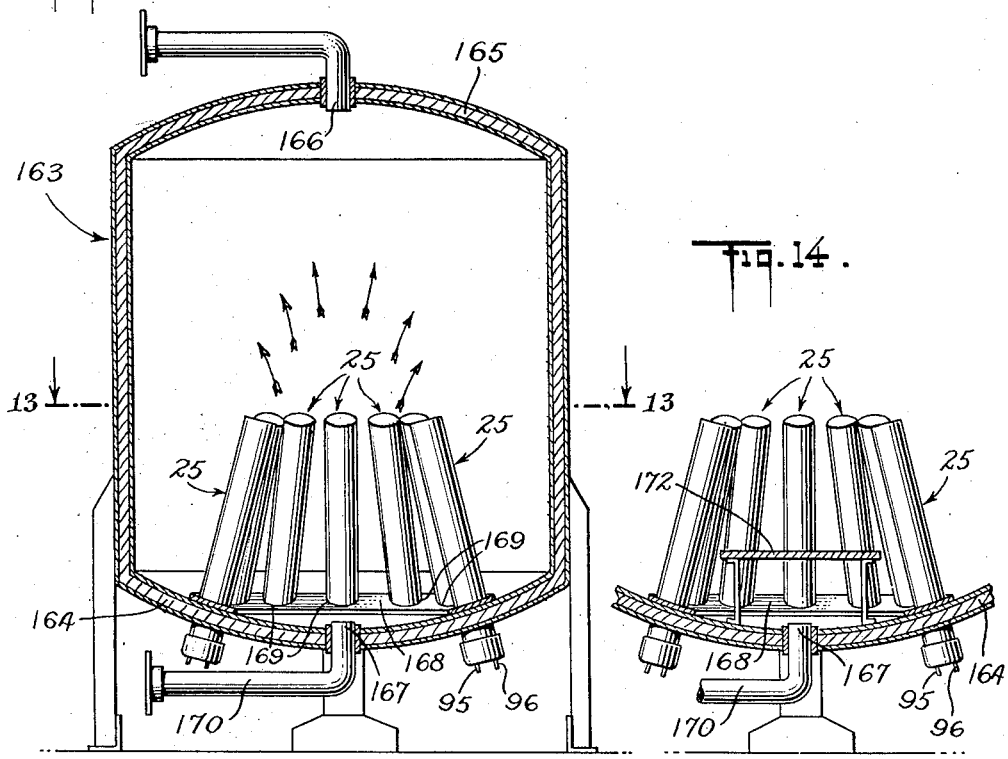
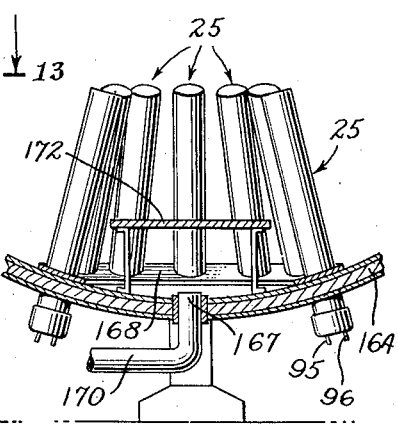
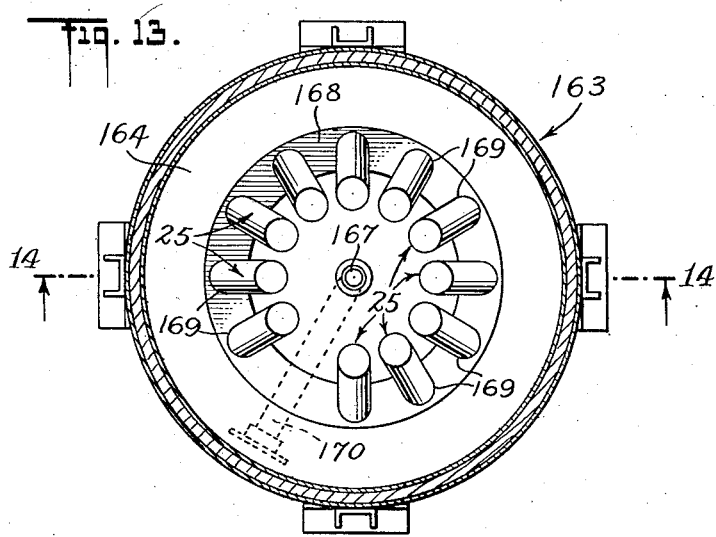
INVENTOR
Arthur G. Brown
BY
Blair, Curtis + Dunne
ATTORNEYS Patented Oct. 27, 1936

2,058,769

UNITED STATES PATENT OFFICE 2,058,769

HEATING APPARATUS AND METHOD OF HEATING

Arthur George Brown, Manchester, England, assignor to F. C. Colby, Brooklyn, N. Y.

Application December 5, 1933, Serial No. 701,021

25 Claims. (Cl. 219—38)

This invention relates to a heating apparatus or the like and a method of heating.

One of the objects of this invention is to provide a simple, practical and thoroughly durable heating plant. Another object is to provide apparatus of the above nature which will be inexpensive in manufacture, efficient in operation, and thoroughly safe and dependable in performance. Another object is to provide apparatus of the above nature which can be easily assembled and readily installed by unskilled labor. Another object is to provide apparatus of the above character wherein the cost of operation will be at a minimum in proportion to the heat produced. Another object is to provide apparatus of the above character which can be automatically controlled thus requiring very little attention. Another object of this invention is to provide a method of converting and storing heat which will be simple and inexpensive in practice yet thoroughly practical and efficient. Another object is to provide a method of the above nature for converting and storing heat which can be readily practiced by a novice without danger of injury.

Other objects will be in part obvious and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings, in which are shown several of the various possible embodiments of my invention, Figure 1 is a diagrammatic view of one embodiment of my invention as installed for use;

Figure 2 is a vertical sectional view of a heater unit shown in Figure 1;

Figure 3 is a fragmentary horizontal sectional view, taken along the line 3—3 of Figure 2;

Figure 4 is a vertical sectional view taken along the line 4—4 of Figure 2;

Figure 5 is an enlarged perspective view of one of the parts of the heater unit shown in Figure 2;

Figure 6 is a top plan view, partially in section, of a storage tank in another embodiment of my invention;

Figure 7 is a partially diagrammatic vertical sectional view of the tank shown in Figure 6 and taken along the line 7—7 thereof, certain parts thereof being broken away;

Figure 8 is a horizontal sectional view taken along the line 8—8 of Figure 7;

Figure 9 is an elevation of one of the parts of the heater unit shown in Figure 7, certain portions thereof being broken away;

Figure 10 is an enlarged top plan view, partially in section, of the heater construction shown in Figure 7;

Figure 11 is a perspective view showing further details of the heater construction shown in Figure 7;

Figure 12 is a vertical sectional view of certain heater parts in a further embodiment of my invention;

Figure 13 is a horizontal sectional view taken along the line 13—13 of Figure 12, and Figure 14 is a vertical sectional view taken along the line 14—14 of Figure 13.

Similar reference characters refer to similar parts throughout the several views of the drawings.

As conducive to a clearer understanding of certain features of this invention, it might here be pointed out that heating systems are subject to numerous weaknesses both inherent and resulting from improper operation. For example, the ordinary hand stoked furnace must be carefully tended to operate with a small degree of efficiency and even when so operated it is impossible to maintain an even temperature throughout the radiation system. Heating plants of this type are further characterized by the emission of noxious gases both unpleasant and unhealthful and by the large amounts of labor necessary to stoke them and remove ashes therefrom and dispose of the same. The furnaces in systems of this nature must be cleaned at least once a year and the sections and grates must be given considerable care to avoid the risk of burning them out. All of these various attentions entail much time, inconvenience and hard manual labor. Because of the large heat losses caused by even the best designed chimneys, a large part of the heat is lost and only a relatively small portion can be used. Other types of heating plants have incorporated therein automatic oil burners or coal stokers, and, while they are not subject to all of the above disadvantages, they have others of equal inconvenience and in some cases greater danger. In system employing the oil burner, for example, a large oil tank must be installed on the premises in order to maintain an ample supply of fuel oil. Thus not only a potential source of danger from fire or explosion ensues, but, also, the tank itself takes up a great deal of room and is extremely cumbersome. Furthermore, oil burners are not only notoriously noisy, smudgy, expensive in operation and in initial cost and not thoroughly dependable, but also are dangerous through their propensity for exploding. All of the above types of heat converters must be connected with a flue or chimney of some sort in order to deflect unburned gases and provide a draft for combustion. The heat losses incurred through useable heat going up the chimney are notoriously large and the efficiency of the heating plant is notoriously small. One of the objects of this invention is to provide a construction and a method wherein the above difficulties as well as many others are successfully and efficiently overcome.

Referring now to Figure 1, there is generally indicated at 20 a hot water storage tank having outlet flow ports 21 and 22 and return water ports 23 and 24, all as will be more fully described hereinafter. An electric heater unit generally indicated at 25 is preferably horizontally disposed adjacent the curved bottom 26 of tank 20 and extends through the side of the tank. Unit 25 is suitably supported in operative position at one end thereof, as, for example, by a standard 28 secured to bottom 26 and by a bushing 29 or the like in the side of the furnace. Unit 25 is preferably provided with heat diffusing fins or convolutions 30 and a terminal or sealing cap 31, all as will be more fully described hereinafter.

As tank 20 is subjected to high pressures, bottom 26 and top 31 thereof are preferably concentrically curved so as to withstand such pressures. Top 31 is further preferably provided with openings 32 and 33 to receive a thermometer 34 and a pipe 35 respectively. Pipe 35 has suitably connected therewith a pressure gauge 36 and a safety valve 37 and preferably continues past safety valve 37 to an overflow tank (not shown). Tank 20 has conveniently installed thereon a thermostat 38 and a pressurestat 40 which may be of any suitable type, the operation of which will be more fully described hereinafter. Thermostat 38 is connected with unit 25 by a suitable conductor 38a, unit 25 being connected by a conductor 25a with a source of power 25b.

A circulating pump 39 is suitably connected to outlet port 22 by a pipe 39a and to return water port 24 by a pipe 39b. Pump 39 is preferably electrically connected in series with thermostat 38 by conductors 39x and 38b and with source 25b with conductor 39y. Thus when thermostat 38 is affected to close the circuit to instigate operation of unit 25, pump 39 will also operate to cause a steady circulation of water out of and into tank 20 thus avoiding varying zones of temperature within tank 20.

Mounted in port 21 is a bushing 42 which is preferably secured to top 31 as by welding. A pipe 41 is threaded into bushing 42 and has attached thereto preferably an isolating valve 41a and a thermostatically controlled valve 43 thence connecting with a temperature equalizer vessel generally indicated at 44. Pipe 41 leads into preferably one end of vessel 44 through a port 45 which suitably receives a bushing 46 into which pipe 41 is threaded, bushing 46 being secured to vessel 44 in any suitable manner, as, for example, by welding. A thermostatic device 47 is installed preferably in the other end of vessel 44. Thermostat 47 is preferably of the expansion type and is connected to valve 43 by a pipe 48. However thermostat 47 and valve 43 may be of any type, as, for example, electrical or mechanical.

Suitably located in the top of vessel 44 is a port 49 disposed within which is a bushing 50 secured to the vessel in any suitable manner. A pipe 51 is threaded into bushing 50 and conducts hot water or the like to the various radiators or the like in my system diagrammatically indicated at 55. A thermostatically controlled valve 52 in pipe 51 is suitably connected to a power source 53 and a thermostat 54 is thermally related in a desirable manner with the space heated by the radiators 55. Thus the flow of hot water or the like from vessel 44 to the radiators 55 is automatically controlled by thermostat 54 which causes valve 52 to open or close according to the temperature thereof. For example, if thermostat 54 is set at 70° F., and if the temperature in this space falls below 70° F., a switch in the thermostat automatically closes and completes the circuit to valve 52 causing the valve to open, thus permitting the flow of hot water or the like. Then when the temperature in the space rises to 70° F. the switch in the thermostat automatically opens, breaking the electric circuit and thus permitting valve 52 to close and stop the flow of hot water or the like.

In order to accommodate the flow of return water or the like from space 55, I provide a return water system including pipes 56, 57, 58, 59, 60, and 61; a high pressure pump 62 and a back pressure or safety valve 63 all as will be more fully described hereinafter.

Pipe 56 is connected to a fitting 64 from which pipe 57 leads into vessel 44 through a port 66 therein. Thus I provide a branch line through which the return water, which has dispensed most of its useable heat can flow into the temperature equalizer to reduce the temperature of the hot water or the like to a useable degree. Not only do I utilize the return water in this manner, but, also, by diluting a small portion of very hot water with a larger portion of relatively cool water, I do not have to expend such a large amount of hot water from tank 20. Furthermore this permits more even temperature in the space as the water flowing into radiators 55 will not be so hot as to continue the heating therein past the desired temperature.

As only a portion of the return water is diverted into vessel 44, I provide a pipe 58 also connected to fitting 64 and leading into pump 62. If the pressure in tank 20 is too high to permit normal flow of return water to the tank, pump 62 forces the return water through pipe 59, fitting 65 and pipe 61 into the tank through inlet port 23. Interposed between fittings 64 and 65 preferably I provide back pressure or safety valve 63 and pipe 60 to form a by-pass to the pump in the event of generation of excessive pressure in tank 20, thus avoiding the risk of rupturing the tank.

A motor 68 on pump 62 is preferably controlled by pressurestat 40 and thermostat 54 which are connected in series with one another and valve 52 to source 53 by conductors 67, 67a, 67b, and 67c. Thus when the pressure in tank 20 is too high to permit normal flow of return water by way of pipe 56 from radiators 55 to tank 20, pressurestat 40 closes the circuit and as thermostat 54 is already closed at this time the circuit from source 53 to motor 68 on pump 62 will be completely closed, and pump 62 will operate to force return water into tank 20 against the pressure therein, subject, of course, to the above-mentioned excessive pressure in the tank. Thermostat 54 and pressurestat 40 being connected in series, it is obvious that both must be closed in order that valve 52 and pump 62 will operate. As there is almost always considerable pressure in tank 20, the switch in pressurestat 40 will be closed practically all the time thus leaving thermostat 54 free to close the entire circuit when affected to do so by a temperature drop. If the pressure in tank 20 is so low as not to affect pressurestat 40 (this condition occurring but rarely) any suitable manually operable switch (not shown) may be employed to close the circuit so as to operate valve 52. Under these conditions pump 62 is not needed as the pressure will not be high enough to prevent the flow of return water into tank 20.

Referring now to Figure 2 in which is shown an enlarged fragmentary section of heater unit 25 without the diffusing fins 30, a tube or container 69 preferably metallic and cylindrical in shape is sealed at one end by a bottom 70 and has its outer periphery partially threaded at 71 adjacent the open end of the tube. At preferably evenly spaced intervals in tube 69 I provide three spiders generally indicated at 72, 72a, and 72b substantially identical and preferably of suitable dielectric material, as, for example, porcelain. As more clearly shown in Figure 5, spider 72 comprises a main body 73 preferably cylindrical in shape and integrally formed therewith three legs 74 extending therefrom substantially as indicated, the legs 74 being spaced from the opposite ends of body 73. A bore 75 extends part way through end 82 of body 73 and opens into a larger bore 76 to form a shoulder 81, as more clearly shown in Figure 2, body 73 having a slot 77 cut in end 83 thereof. Slot 77 is preferably coextensive with bore 76.

As more clearly shown in Figure 4, legs 74 preferably loosely engage the inner surface of tube 69, clearance being provided to accommodate expansion and contraction due to high temperatures and cooling periods. In assembling my heater unit 25, I prefer to secure a suitable conductor rod 78 or the like to spider 72a by inserting one end thereof into bore 75a and holding it therein by suitable nuts or the like 79 and 80 threaded on rod 78. Next a preferably annular tube 84 of any suitable dielectric material is positioned on end 82a of spider 72a to abut against legs 74a, thus encasing rod 78.

Tube 84 carries a suitable resistance means, and illustratively is encircled by a suitable resistance wire 85, as, for example, nichrome wire, one end of which is inserted through slot 77a and secured to rod 78 by a nut 86. Next the assembly consisting of spider 72a, rod 78, and tube 84 is positioned in tube 69 so that end 83a of the spider is substantially in engagement with bottom 70 of tube 69. I now pack a semi-solid material 87, as, for example, powdered magnesia or any other substance having a high fusing point and great heat conductivity, around rod 78 inside of tube 84 and also in the space between tube 84 and tube 69. Next the second spider 72 is inserted into tube 69 so that rod 78 extends through bores 75 and 76, and end 83 enters tube 84 until legs 74 abut against the free end of tube 84. I next place a tube 84a, substantially similar to tube 84, in tube 69 encasing rod 78 so that end 82 of spider 72 enters the tube 84a until the end of the tube abuts legs 74 of the spider. Additional material 87 is then packed inside and outside of tube 84a until the spaces are substantially filled. Tube 84a is encircled with suitable wire 85a similar to wire 85, the wire on each tube being joined together in any suitable manner as by soldering a link 88 therebetween. A third spider 72b is now inserted into tube 69 about rod 78, end 82b thereof entering tube 84a until legs 74b abut against the free end of tube 84a.

Spider 72b is held in engagement with tube 84a by a nut 89 threaded on rod 78 and abutting against shoulder 81b. Thus as nut 89 is taken up on rod 78, the three spiders and the two tubes 84 and 84a are pulled together in tight engagement with one another. It will be noted that spiders 72a and 72 preferably have their similar ends 83a and 83 pointing in one direction, whereas spider 72b has its end 83b pointing in the opposite direction in order to accommodate nut 89 in large bore 76b.

Rod 78 has a bend 90 at one end in order to extend through a hole 91 in a cap 92 which snugly closes the open end of tube 69. Rod 78 is securely held in hole 91 by a pair of nuts 93 and 94. The end of rod 78 is threaded to receive nut 95a thus forming a terminal generally indicated at 95 suitable for receiving an electrical conductor or the like. A second terminal generally indicated at 96 is provided preferably by inserting a threaded rod 97 through a hole 98 in cap 92 and holding it in position therein by nuts 99 and 100. Terminal 96 is connected to wire 85a preferably by a suitable link 101.

As more clearly shown in Figure 3, cap 92 is firmly held in assembled relation with tube 69 by a suitable nut 102 or the like threaded onto tube 69. A lug 103 is integral with cap 92 and extends therefrom to provide a handle to facilitate the positioning or removal of the cap and to provide an insulating wall between the terminals. Cap 92 and lug 103 are preferably composed of any suitable dielectric material, as, for example, porcelain. Preferably a cup-shaped cover 104 fits closely over nut 102, being secured thereto by suitable screws 105 and 106. Thus it will be clear that I have provided a compact and sturdy self-contained heater unit capable of efficient operation and long use in a suitably insulated tank capable of withstanding high pressures and having the several connections and fittings hereinabove described.

Referring now to Figures 6 and 7 showing a modification of my invention, there is diagrammatically indicated at 107 a tank similar in many respects to tank 20 in Figure 1. Tank 107 is preferably provided with a plurality of ports and openings 111, 112, 113, 114, 115, 116, 117, 118, 119, 120, and 121. Ports 111 and 112 preferably receive suitable outflow pipes 124 and 125. In a substantially similar manner I preferably provide a pair of return water pipes 126 and 127 associated with ports 113 and 114 respectively. Port 116 preferably receives a suitable thermostat or the like (not shown) which may be similar to thermostat 38 in Figure 1. Likewise, port 115 preferably receives a pressurestat or the like (not shown) which may be similar to pressurestat 40 in Figure 1. I also prefer to provide a pair of suitable bosses or the like 131 and 132. (Figure 6) on the top of tank 107 in which may be installed temperature and pressure indicators (not shown) substantially similar to thermometer 34 and gauge 36 in Figure 1 and a suitable safety valve and overflow pipe (not shown) which may be similar to valve 37 and pipe 35 in Figure 1.

Thus it will be seen that in some respects tank 107 and some of its fittings are substantially similar to tank 20 and some of its fittings; this feature permitting standardization of many parts and accordingly reducing production costs.

Vertically disposed within tank 107 and extending through the top and bottom thereof are preferably three heating units or the like generally indicated at 133, 134 and 135 (Figure 6). However, as many units as needed may be disposed in the tank. As more clearly shown in Figure 7, unit 133 is suitably received in openings 118 and 120 of tank 107, and unit 134 is suitably received in openings 119 and 121 of the tank. As the three units are substantially identical in construction and operation, a description of but one will suffice. Unit 133 comprises a preferably cylindrical shell 136, a bottom 137 preferably spaced from the lower extremity of the shell, and a flange 138 having bolted thereon in any suitable manner a top or cover plate 139. Cover plate 139 is preferably provided with suitable bosses 140 and 141 into which are threaded heat responsive devices (not shown), as, for example, a thermostat, to control the operation of the heating unit, and a thermometer for temperature recording purposes. Shell 136 preferably has a suitably positioned opening 142 which receives a pipe 143 through which a suitable liquid, as, for example, oil, may be introduced into the shell. In order to drain such fluid from the shell, I provide a suitable pipe connection 144 and pipe 145 in bottom 137.

Suspended in shell 136 by a rod 146 conveniently secured thereto is a series of parallel perforated plates generally indicated at 147 (Figure 7). As more clearly shown in Figures 9 and 11, plates 147 comprise preferably a pair of top plates 148 and 148a, a second pair of plates 149 and 149a, a third pair of plates 150 and 150a, and as many more pairs of plates as are needed or desirable depending on the length of shell 136. Plate 148 has a pointed top portion 151 through which a hole 152 extends to accommodate rod 146. Plate 148 is further preferably provided with a plurality of holes 153 suitable for receiving rods 154 and 155 upon which plate 149 may be supported and secured to plate 148 by suitable nuts or the like. Plates 150 and 150a may be similarly secured to plates 149 and 149a respectively.

Thus it will be seen that practically any length of parallel plates can be readily provided. It will be further seen that all the plates are substantially identical with the exception of the top plates which differ in that they have pointed ends as pointed out above. I thus achieve further standardization of parts and a resultant facility in production.

All of the plates are preferably provided with a suitable number of perforations 156 shown in Figures 7, 9, and 11. These perforations 156 preferably receive bushings or the like 157 which may be of any suitable dielectric material, as, for example, porcelain. Bushings 157 have inwardly extending portions 158 over which a preferably hollow tube or the like 159 fits. Tube 159 is preferably cylindrical in form and may be of any suitable dielectric material, as, for example, porcelain. Tube 159 is secured to bushings 157 in any suitable manner and has wound thereabout suitable resistance wire 160, as, for example, nichrome wire. Wire 160 extends through opposite bushings 157 to a pair of leads 161 and 161a each of which is respectively connected to conductors 162 and 162a. Conductors 162 and 162a may be connected with a power source and a thermostat in a manner similar to that in which unit 25 (Figure 1) is connected to thermostat 38 and source 25b. Thus by assembling any suitable number of tubes, similar to tube 159, between plates 147, a practical and highly efficient electric heater unit is built up, the operation of which will be more fully described hereinafter.

With reference to Figures 12, 13, and 14 in which is shown another modification of my invention, a tank is diagrammatically indicated at 163. Tank 163 may correspond in practically all respects with tank 20 or tank 107 except that it preferably has a curved bottom 164 and a curved top 165, bottom 164 curving downwardly. Although not illustratively shown in Figure 12, tank 163 may be equipped with thermostats, pressurestats, thermometers, safety valves, etc. as described hereinabove with respect to tanks 20 and 107, the operation of which corresponds therewith as will be more fully described hereinafter. Tank 163 is illustratively shown as having an outlet port 166 and an inlet or return water port 167; however, it is obvious that more ports may be provided as desired to accommodate the above-mentioned thermostats, etc.

An annulus or stiffening ring 168 is secured to bottom 164 in any suitable manner as by welding, for example, and is preferably formed to have its under surface in complete engagement with bottom 164. Thus the top surface of ring 168 slants downwardly with bottom 164. A plurality of heater units 25 are inserted through a number of spaced holes 169 in ring 168, holes 169 being in registry with similar holes (not shown) in bottom 164 through which the units 25 extend to protrude a suitable distance below bottom 164. The units 25 have electrical connections at terminals 95 and 96 with a thermostat and a power source which may be similar to the connection of unit 25 with thermostat 38 and source 25b in Figure 1. As units 25 are secured to ring 167 in substantially perpendicular relation therewith, they extend upwardly in tank 163 in converging relation to form a frusto-cone, as more clearly shown in Figure 13. Thus return water fed into the tank by a pipe 170 is heated by the units 25 and circulated in the tank as indicated by the arrows in Figure 12. I thus achieve ample and efficient circulation within the tank without employing any other circulating devices and accordingly simplify and reduce the construction and cost of operation.

In certain circumstances it is desirable to distribute the return water over the bottom of tank 163. I therefore prefer to secure a baffle plate or the like 172 to bottom 164 (Figure 14) against which the return water flowing from pipe 170 impinges and is accordingly distributed over the bottom of the tank.

Each embodiment of my invention hereinabove disclosed has certain advantages peculiar to different circumstances. However, as each operates in a manner substantially similar to that in which the others operate, with certain limitations, a general description of the operation of one will suffice.

With reference again to Figure 1, fluid is introduced into the system in any suitable manner until the whole system is completely filled. Assuming this fluid to be at a low temperature it will cause thermostat 38 to close the circuit between unit 25 and source 25b. Thermostat 38 thereafter remains closed until the water in tank 20 reaches its predetermined high temperature value and thence operates intermittently with respect to the predetermined low temperature value to maintain this condition. As the water may be heated to temperatures in excess of 500° F.

and as tank 20 is heavily insulated and will withstand high pressures, a considerable amount of heat is thus stored and can be used at will in the following manner.

When the temperature in radiators 55 falls below a given degree, thermostat 54 will be affected to close the circuit between source 53 and electrically actuated valve 52 thus to open valve 52. Hot water is thus permitted to flow from the temperature equalizer vessel 44 by thermosyphonic action into the radiators, and also relatively cooler return water flows from the radiators into vessel 44, thus reducing the temperature of the water therein. As hot water continues to flow from the vessel 44, the temperature therein will decrease to a predetermined minimum which will affect thermostat 47. This will cause valve 43 to open and permit the flow of superheated water from storage tank 20 to vessel 44 until the temperature therein rises to a point where thermostat 47 closes valve 43.

As hot water has flowed from tank 20, return water from the radiators must take its place. However, the pressure in tank 20 may be too high to permit the normal flow of return water thereinto. In that event, pressurestat 40 is so affected as to close the circuit between motor 66 and source 53 thus actuating pump 62 which will then operate to force return water into tank 20 against pressure therein, thermostat 54 already being closed. If the pressure attains a predetermined maximum, pump 62 will not endanger the tank by exceeding the maximum pressure as the water will by-pass through the pipe line in which back pressure valve 68 is included.

By heating a large body of water to a high temperature, drawing small quantities therefrom at intervals, diluting the superheated water with a large amount of relatively cool return water, and then distributing the diluted superheated water in radiators 55, I can maintain a practically constant temperature and avoid the usual lag in bringing a room up to the desired temperature; this being due to the fact that there is superheated water immediately available, and the necessity of waiting for a coal or oil fire to heat the water is obviated. In order that the high temperature of the water in tank 20 and vessel 44 may be maintained, it is preferable that they be heavily insulated. Heat losses may also be further reduced by suitable insulation of all pipes and fittings in the customary manner.

When tank 107 is used in place of tank 20, the operation is substantially similar to that set forth hereinabove except that there may be an additional thermostat (not shown) installed in heater unit 133 to control the action thereof in any suitable manner. Thus when the temperature of the oil or other liquid in the unit falls below or exceeds a predetermined temperature, an electric circuit is made or broken respectively to permit or cut off the flow of current into the individual heating elements of the unit. If oil is used in this unit, it should preferably be a high-flash Pennsylvania type in order to withstand the high temperatures. However, other semi-viscous liquids or even semi-solids preferably having a high coefficient of heat conductivity may be used with high efficiency.

When the heater unit 25 is used it is preferable that a semi-solid of great heat conductivity, such as magnesia, for example, be used as a filler. Any substance, however, having a high fusing point and characterized by resistance to chemical change during heating may be used under certain conditions.

It will be clear from the above that my heating apparatus while here shown as a hot water thermosyphon system may under certain conditions be used with a steam system or a pressure-vacuum system with certain comparatively minor variations.

One of the many advantages that accrue to an electric heat storage system such as described herein lies in the economies in operation which may be effected, particularly in localities wherein the cost of electricity varies during different hours of the day. For example, in some localities, power may be purchased at greatly reduced rates during the late hours of the night and early hours of the morning. Thus my heating plant can be operated during those hours to store up a sufficient quantity of heat in the form of superheated water for use during the remaining hours of the day when power rates are considerably higher.

It will thus be seen that I have provided a thoroughly practical and efficient construction and method in which the several objects hereinabove referred to as well as many others are successfully and practically accomplished.

As many possible embodiments may be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:

1. In a heating system, in combination, a hot water storage tank having a pair of outlets and a pair of inlets, container means filled with a semi-viscous fluid, said means being disposed in said tank, a heating unit disposed in said container means, a recirculating channel connected to one of said outlets and one of said inlets, pump means connected with said channel and adapted to force water from said outlet to said inlet, a temperature equalizer vessel having a plurality of openings therein, pipe means connecting the other of said storage tank outlets with one of said openings, an outflow channel connected to another of said openings, a return water channel connected to another of said openings, said last-mentioned channel having a branch connected to the other of said inlets in said tank and adapted to conduct a portion of the return water to said tank, and temperature responsive means in said tank cooperatively associated with said heating unit and said pump means, said temperature responsive means adapted to instigate relative coaction therebetween.

2. In a heating system, in combination, a hot water storage tank having a pair of outlets and a pair of inlets, a heater element in said tank, a temperature equalizer vessel, recirculating pump means, a high pressure pump element, and a system of piping connecting said vessel with one of said outlets and one of said inlets, said recirculating pump means with the other of said outlets and the other of said inlets, and said pressure pump element with said first-mentioned inlet.

3. In a heating system, in combination, a hot water storage tank, an electric heater unit in said tank, means adapted to circulate the water in said tank, thermostatic means associated with said tank and adapted to instigate operation and cooperation of said unit and said first-mentioned means, temperature equalizer means, an outflow line having thermostatic control means incorporated therein and connecting said tank and said equalizer means whereby, upon the operation of said thermostatic means, hot water from said tank is permitted to flow into said equalizer means, an outflow channel leading from said equalizer means to distribute heat, a return line connected to said outflow channel and connected to said tank, said return line having a branch communicating with said equalizer means, and pump means associated with said return line and adapted to force return water into said tank.

4. In a heating system, in combination, a hot water storage tank having an outlet and an inlet, means for heating water in said tank, a temperature equalizing vessel having a plurality of ports, a pipe connecting said outlet with one of said ports, whereby water from said tank flows into said vessel, a pipe connected to another of said ports and adapted to distribute hot water through a space to be heated, a return water pipe connecting said distributing pipe to said tank inlet, and a pipe connecting said return water pipe to another of said vessel ports, whereby a portion of the returned water may be diverted into said vessel.

5. In a heating system, in combination, a tank having an inlet and an outlet, a plurality of heater units secured to the bottom of said tank and extending upwardly therefrom in converging relation, a system of piping adapted to distribute and circulate heat generated by said units in said tank, said system including a branch connected to said outlet and a branch connected to said inlet in the vicinity of said units, and baffle means in said adjacent inlet whereby return water is distributed about the bottom of said tank and the base portions of said units.

6. The herein described art, which consists in heating a fluid body, transferring the heat from said fluid body to another body of different consistency, transferring said second mentioned fluid to a tank, controlling the flow of said second mentioned fluid into said tank, circulating said second mentioned fluid through a space to be heated, returning said second mentioned fluid to the vicinity of said first mentioned fluid and diverting a portion of the said returning second mentioned fluid into said tank.

7. In a heating system, in combination, a hot water storage tank having an inlet and an outlet, a plurality of electric heating elements grouped in conoidal form, means for reducing the temperature of hot water, a pipe connecting said means with said outlet port, thermostatic means in said pipe adapted to control the flow of hot water from said tank to said first mentioned means, a system of piping connected to said first mentioned means and adapted to distribute heat through a space to be heated, a return water pipe connected to said system and said inlet port, said inlet port being disposed centrally and at the base of said conoidal group, and a pipe connecting said return water pipe and said temperature reducing mentioned means, whereby a portion of the return water is diverted into said first means.

8. In a heating system, in combination, a hot water storage tank, a plurality of heating units disposed within said tank and coextensive with the depth thereof, said units each comprising a container adapted to receive a fluid body, said container having disposed therein a plurality of plates adapted to support a plurality of electric resistance elements, a vessel disassociated from and communicable with said tank, and adapted to reduce the temperature of water heated in said tank, means for forcing return water into said tank under pressure and means for diverting a portion of said return water into said vessel.

9. In a heating system, in combination, a hot water storage tank, heating means in said tank, a vessel, heat exchange apparatus, means connecting said vessel to said heat exchange apparatus, and means adapted to conduct some of the water in said heat exchange apparatus back to said vessel.

10. In a heating system, in combination, a hot water storage tank, heating means for said tank, a vessel, means connecting said tank and said vessel, heating apparatus, said tank, said vessel, and said apparatus including means for conducting a portion of the water from said apparatus back to said vessel.

11. In a heating system, in combination, a heat storage tank adapted to contain a fluid, heating means in said tank, a vessel communicable with said tank, a system of heat exchange units, means for conducting part of the fluid from said system to said vessel and another part of the fluid in said system to said tank, and temperature responsive means for controlling said heating means and for controlling the flow of fluid.

12. In a heating system, in combination, a hot water storage tank, intermittently operable heating means disposed within said tank, means for circulating the water in said tank, a vessel, a plurality of channels connecting said tank with said vessel whereby water heated in said tank flows into said vessel, a system of heating pipes, and means for conveying a quantity of water into said system and for conveying a smaller quantity of water back from said system into said vessel.

13. In a heating system, in combination, means for heating and storing hot water at high temperatures and pressures, a vessel communicable with said means, a system of heater units connected to said vessel and said means, pressure responsive means in said vessel for periodically permitting very hot water to flow from said first-mentioned means into said vessel, and means for introducing into said vessel a portion of the relatively cool return water from said system into said vessel whereby the temperature of said very hot water is reduced.

14. In a heating system, in combination, a high pressure hot water storage tank, means for heating the water in said tank to high temperatures, and means for circulating said hot water, said means including a vessel and pipe connection whereby a portion of the return water dilutes the hot water flowing from said tank to reduce the temperature thereof.

15. In a heating system, in combination, a high pressure hot water storage tank, means for heating the water in said tank at high pressures, a system of heat exchange units, means interposed between said system and said tank for reducing the temperature and pressure of water before flowing to said system, and a pump member for forcing return water from said system into said tank.

16. In a heating system, in combination, a hot water storage tank, means for heating the water in said tank, and means communicable with said tank for reducing the temperature of the hot water flowing therefrom, said means including a pipe connection whereby a portion of the return water is mingled with the hot water flowing from said tank.

17. In a heating system, in combination, a hot water storage tank, a plurality of heat storage units disposed within said tank, each of said units containing a fluid, means for heating the fluid in said containers, a vessel communicable with said tank, a system of heating units connected to said vessel and said tank, said system including a branch connected to said vessel through which a portion of the return water is introduced into said vessel to mingle with hot water flowing into said vessel from said tank to reduce the temperature of said hot water.

18. In a heating system, in combination, a hot water storage tank, electric heating means in said tank, means for recirculating the water in said tank during the operation of said heating means, a heat exchange system, means connecting said vessel to said heat exchange system, and means adapted to conduct some of the water in said heat exchange system back to said vessel to reduce the temperature of the hot water flowing thereinto from said tank.

19. In a heating system, in combination, a hot water storage tank, electric heating means in said tank, means for recirculating the water in said tank during the operation of said heating means, a heat exchange system, means connecting said vessel to said heat exchange system, means adapted to conduct some of the water in said heat exchange system back to said vessel to reduce the temperature of the hot water flowing thereinto from said tank, and means for forcing the remainder of the water in said heat exchange system into said tank.

20. In a heating system, in combination, a hot water storage tank, means for heating the water in said tank, means for recirculating the water in said tank, a heat circulatory system connected to said tank, and a high pressure pump element adapted to force return water into said tank.

21. In a heating system, in combination, a hot water storage tank, means for heating the water in said tank, a vessel connected to said tank, a system of heating units connected to said vessel and said tank, said system including a branch adapted to conduct a portion of the return water from said system into said vessel, pressure responsive means in said vessel for permitting periodically the flow of hot water from said tank into said vessel whereby the temperature of said hot water is reduced by intermingling with a portion of the return water introduced into said vessel by way of said branch, and means responsive to variations in temperature for permitting an outflow of water from said vessel into said system.

22. In a heating system, in combination, a hot water storage tank, means for heating the water in said tank, a vessel connected to said tank, a system of heating units connected to said vessel and said tank, said system including a branch adapted to conduct a portion of the return water from said system into said vessel, pressure responsive means in said vessel for permitting periodically the flow of hot water from said tank into said vessel whereby the temperature of said hot water is reduced by intermingling with a portion of the return water introduced into said vessel by way of said branch, means responsive to variations in temperature for permitting an outflow of water from said vessel into said system, and pump means for forcing return water back into said tank against the pressure of water therein.

23. In a heating system, in combination, a hot water storage tank, means for heating the water in said tank, a vessel connected to said tank, a system of heating units connected to said vessel and said tank, said system including a branch adapted to conduct a portion of the return water from said system into said vessel, pressure responsive means in said vessel for permitting periodically the flow of hot water from said tank into said vessel whereby the temperature of said hot water is reduced by intermingling with a portion of the return water introduced into said vessel by way of said branch, means responsive to variations in temperature for permitting an outflow of water from said vessel into said system, pump means for forcing return water back into said tank against the pressure of water therein, and means responsive to the pressure in said tank for instigating the operation of said pump means, said last-mentioned pressure responsive means and said temperature responsive means acting in unison to effect a circulation of the water in said system.

24. In a heating system, in combination, a hot water storage tank, an electric heating unit in said tank, pump means for recirculating the water in said tank, temperature responsive means for instigating operation of said electric heating unit, said pump means being included in the circuit of said electric heating unit whereby said pump means operates only when said heating unit is operating, means connected to said tank for reducing the temperature of hot water flowing therefrom, and a heat exchange system connected to said last-mentioned means and said tank for circulating water cooled in said last-mentioned means.

25. In a heating system, in combination, a hot water storage tank having an inlet and an outlet, electric heating means in said tank, a vessel having a plurality of ports formed therein, pipe means connecting said tank outlet to one of said vessel ports, a system of piping connecting one of said vessel ports with said tank inlet, said system including a branch connected to another of said vessel ports whereby a portion of the return water flows into said vessel and is intermingled with hot water flowing therethrough from said tank, and temperature and pressure responsive means adapted to permit the introduction of hot water from said tank into said vessel and of a portion of the return water into said vessel from said system.

ARTHUR GEORGE BROWN.